C. E. De LORIERE.
Apparatus for Transmitting Motive Power.
No. 154,023. Patented Aug. 11, 1874.

2 Sheets--Sheet 1.

Witnesses:
Chas. M. Higgins
Arthur C. Fraser

Inventor:
Chas. E. de Loriere
per Burke & Fraser
attys

2 Sheets--Sheet 2.

C. E. De LORIERE.
Apparatus for Transmitting Motive Power.

No. 154,023. Patented Aug. 11, 1874.

Witnesses:
Chas. M. Higgins
Arthur C. Fraser

Inventor:
Chas. E. de Loriere.
Per Burke & Fraser
Attys

UNITED STATES PATENT OFFICE.

CHARLES E. DE LORIERE, OF WESTMINSTER, ENGLAND.

IMPROVEMENT IN APPARATUS FOR TRANSMITTING MOTIVE POWER.

Specification forming part of Letters Patent No. 154,023, dated August 11, 1874; application filed July 16, 1874.

*To all whom it may concern:*

Be it known that I, CHARLES ERNEST DE LORIERE, of the city of Westminster, England, have invented Improvements in Apparatus for Transmitting Motive Power, and for overcoming the usual loss of power at the dead-points of rotatory machines, of which the following is a specification:

This invention relates to the construction and arrangement of apparatus or machines such as are used as cranes for lifting and lowering weights, for driving shafts of vessels, and rotatory machinery in general, whereby the usual loss of power at the dead-points is considerably diminished, and better results obtained than heretofore.

My invention consists in the combination of a triple-cranked main or driving shaft and a like-cranked driven shaft with three rock-levers, the respective arms of which are connected by pitmen with the cranks of the respective axles, one of the cranks being the main or driving one, while the two others are auxiliary for assisting the main crank in passing its dead-points, the levers of the auxiliary cranks being slotted at their connection with the pitmen of the driven shaft, so that the auxiliary cranks and levers are brought into action only at the point of their most effective leverage, which is at the dead-points of the main crank, and a much better effect thereby produced.

The invention will be clearly understood by the following detailed description, with reference to the accompanying drawings, in which—

Figure 1:
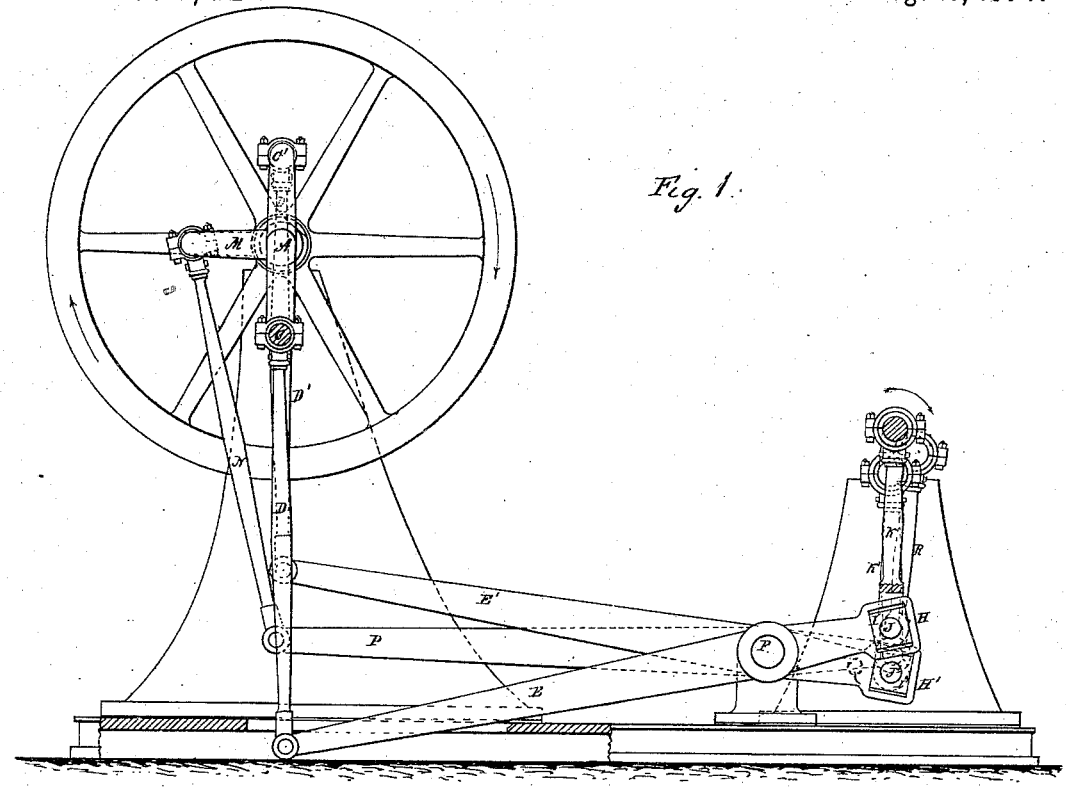
Figure 2:
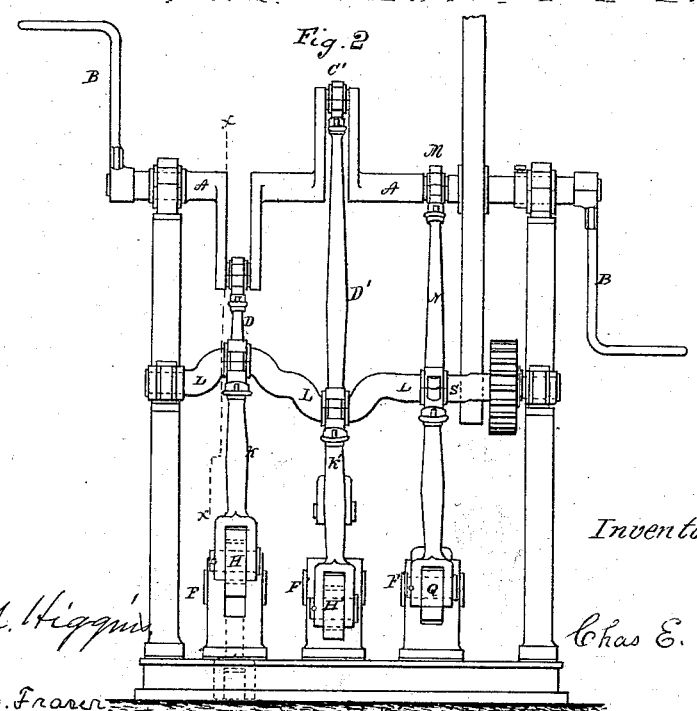
Figure 3:
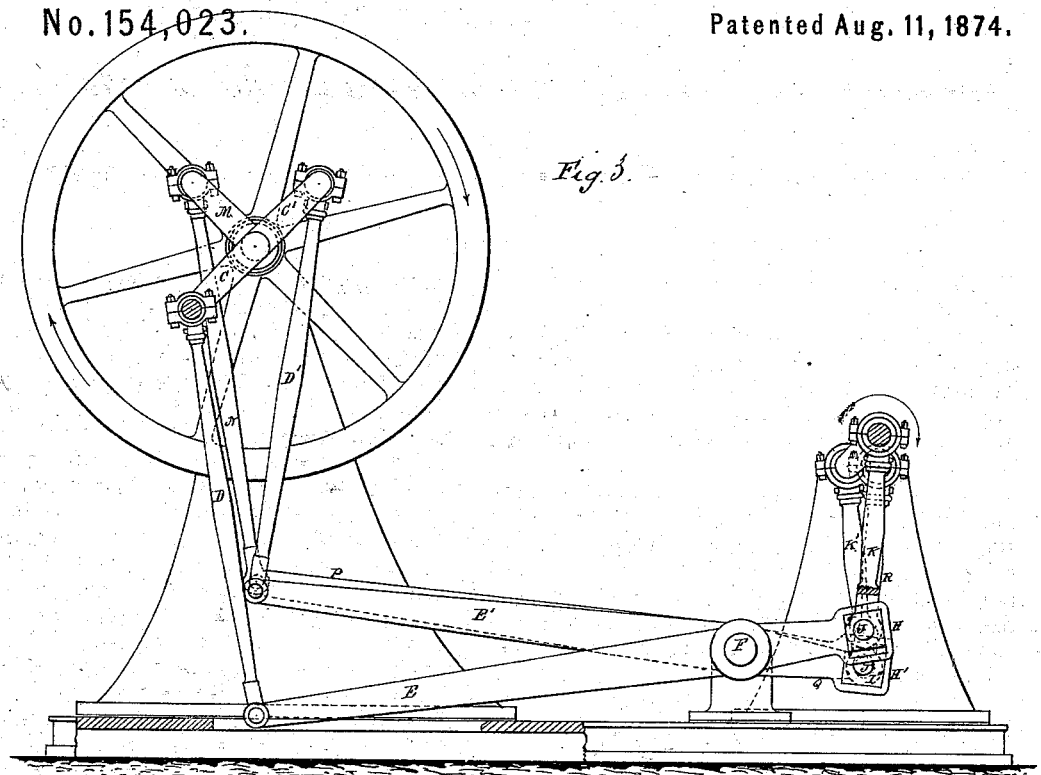

Figures 1 and 2 show an elevation and end view of how I construct my apparatus, and the position the cranks and levers occupy when the two auxiliary cranks are at the dead-centers, and the third or power crank in full action for giving out its force in moving the parts, and for conveying power into the fly-wheel, which is utilized at every alternate half-throw of the power-crank. Figs. 2 and 3 are like views of the apparatus, shown in a different position.

A is the main shaft, which can be driven by band or by crank-handles B B, as shown, or other device. C C' are the two auxiliary cranks upon the shaft, and arranged diametrically opposite to each other, so that when the connecting-rods D D' are vertical, one of them being at the top of its traversing circle and the other at the bottom, the whole force or power of lifting the weight and of putting power into the fly-wheel to carry them over their dead-centers is effected by the power-crank M. These rods D D', at the lower ends, are attached to the long ends or arms of rock-levers E E', which are free to vibrate upon the pivots F F¹, the other or short ends or arms G G' having straps or slots H H' upon them, in which blocks I I' are free to move up and down, the blocks I I' being hung upon joint-pins J J' of connecting-rods K K', which take a position alternately to operate the additional shaft L by its cranks, the throws of which are arranged in relation to the throws of the cranks upon the main shaft A, for maintaining the rotatory motion when the power-crank is approaching to and receding from its dead-points. The crank M of the main shaft has also a rod, N, of a length somewhat shorter than that of the two rods D D', whose lower end is pinned or bolted to the long end or arm of a lever, P, also free to rock upon one of the pivots F². The short arm Q of this lever is pinned or bolted direct, without the intervention of a movable block or slot, to the lower end of a connecting-rod, R, the said rod being also shorter than the rods K K'. The upper end of this rod is attached to the third crank S of the additional shaft L, so that when the auxiliary cranks are crossing their dead-centers the crank M is in full trim for lifting purposes. The blocks I I' in the two straps H H' are alternately put into contact with the upper faces of the straps, one acting as an auxiliary conductor of power to the additional shaft from the momentum of the fly-wheel, the other block acting alternately as a follower under the pressing influence of its descending rod and lever.

Figure 4:
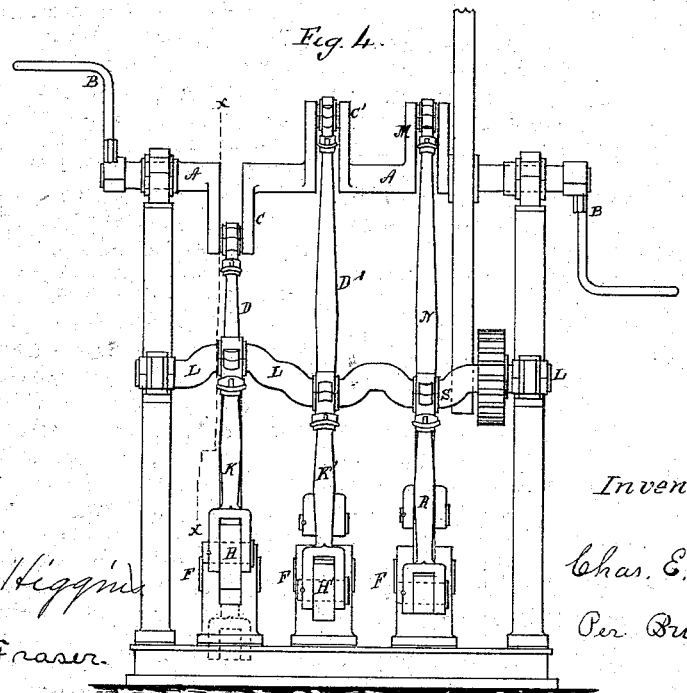

Figs. 3 and 4 represent similar views of my apparatus, with the auxiliary cranks C and levers E in the position they occupy to discharge the accumulated power of the fly-wheel, and when the ordinary crank M is approaching its top dead-center. The crank C is here shown approaching the point in its segment of the circle of traverse, at which the momentum of the fly-wheel can be most effectively discharged, through the rod D, the lever E, and connecting-rod K, upon the corresponding cranks of the auxiliary shaft at the portion of its revolution of greatest leverage upon the shaft, the crank C' exerting no power or force, but simply following round to get into the position of C to act as a power or force lever in its turn, while C becomes an idle follower. While the idle-follower operation of crank C', rod D', and lever E is going on, the play of the block I' in the slot or strap H' is free until the crank C' assumes the position of C, when the block I' impinges upon the top of strap or slot H', and becomes effective, the crank C, rod D, lever E, and rod K, in their turn, becoming followers.

And having now described the nature of my said invention, and in what manner the same is to be performed, I declare that I claim—

The combination of the triple-cranked shafts A and L with the rock-lever P and slotted rock-levers E E', connected by pitmen with the cranks, operating substantially as and for the purpose set forth.

CHAS. E. DE LORIERE.

Witnesses:
E. M. DANIEL,
166 *Fleet Street, London.*
THOMAS COURTNEY,
18 *Oxford Terrace, Chelsea, London.*